(12) United States Patent
Watson et al.

(10) Patent No.: US 10,070,212 B2
(45) Date of Patent: Sep. 4, 2018

(54) WIRELESS AUDIO OUTPUT DEVICES

(71) Applicant: Apple Inc., Cupertino, CA (US)

(72) Inventors: Robert D. Watson, Menlo Park, CA (US); David John Shaw, San Diego, CA (US); Ganesha Adkasthala Ganapathi Batta, San Jose, CA (US); Chandrahas Aralaguppe Chandramohan, Cupertino, CA (US); Gregory Robert Burns, San Francisco, CA (US); Benjamin Huth Byer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,655

(22) Filed: Sep. 22, 2016

(65) Prior Publication Data

US 2017/0013342 A1 Jan. 12, 2017

Related U.S. Application Data

(63) Continuation of application No. 15/171,310, filed on Jun. 2, 2016.
(Continued)

(51) Int. Cl.
*H04W 4/00* (2018.01)
*H04R 1/10* (2006.01)
*H04L 29/12* (2006.01)
*H04W 74/06* (2009.01)
*H04M 1/725* (2006.01)
(Continued)

(52) U.S. Cl.
CPC ....... *H04R 1/1016* (2013.01); *H04L 61/6022* (2013.01); *H04L 67/16* (2013.01); *H04M 1/72525* (2013.01); *H04R 1/1041* (2013.01); *H04R 1/1091* (2013.01); *H04W 4/70* (2018.02); *H04W 12/04* (2013.01); *H04W 74/06* (2013.01); *H04L 63/067* (2013.01); *H04R 1/1025* (2013.01); *H04R 5/033* (2013.01); *H04R 2420/07* (2013.01); *H04R 2460/17* (2013.01); *H04W 4/80* (2018.02); *H04W 84/18* (2013.01)

(58) Field of Classification Search
CPC .................. H04W 4/008; H04W 12/04; H04B 2001/3872; H04B 2001/3866; H04B 5/006
USPC ...................................... 455/41.1, 41.2, 41.3
See application file for complete search history.

(56) References Cited

U.S. PATENT DOCUMENTS 9,210,493 B2   12/2015 Swanson
2003/0100331 A1*   5/2003 Dress .................... H03J 1/0091
                                                  455/550.1
(Continued)

FOREIGN PATENT DOCUMENTS

WO    2014124445 A2    8/2014

OTHER PUBLICATIONS

European Patent Application 16173105-4—Extended European Search Report dated Sep. 23, 2016.
(Continued)

*Primary Examiner* — Wen Huang
(74) *Attorney, Agent, or Firm* — Dickinson Wright RLLP

(57) ABSTRACT

Systems, methods, and non-transitory computer-readable storage media for determining when to wirelessly communicatively couple together a pair of untethered wireless audio output devices and for determining when to erase a connection history stored on one or both of the wireless audio output devices.

20 Claims, 16 Drawing Sheets

Related U.S. Application Data

(60) Provisional application No. 62/171,376, filed on Jun. 5, 2015.

(51) Int. Cl.
| | | |
|---|---|---|
| *H04W 4/70* | (2018.01) | |
| *H04L 29/08* | (2006.01) | |
| *H04W 12/04* | (2009.01) | |
| *H04L 29/06* | (2006.01) | |
| *H04R 5/033* | (2006.01) | |
| *H04W 84/18* | (2009.01) | |
| *H04W 4/80* | (2018.01) | |

(56) References Cited

U.S. PATENT DOCUMENTS

| | | | | |
|---|---|---|---|---|
| 2006/0105712 | A1* | 5/2006 | Glass | G06F 21/31 455/41.2 |
| 2010/0320961 | A1* | 12/2010 | Castillo | H02J 7/0044 320/107 |
| 2011/0286615 | A1* | 11/2011 | Olodort | H04R 1/1025 381/311 |
| 2012/0003933 | A1* | 1/2012 | Baker | G06F 19/322 455/41.2 |
| 2012/0135683 | A1* | 5/2012 | Lee | H04L 63/101 455/41.2 |
| 2012/0284757 | A1 | 11/2012 | Rajapakse | |
| 2012/0309311 | A1* | 12/2012 | Ohira | G08C 17/02 455/41.1 |
| 2013/0238829 | A1 | 9/2013 | Laycock et al. | |
| 2014/0219467 | A1* | 8/2014 | Kurtz | H04R 3/12 381/74 |
| 2014/0378055 | A1 | 12/2014 | Pal et al. | |
| 2015/0050886 | A1* | 2/2015 | Donaldson | H04W 4/00 455/41.2 |
| 2015/0200558 | A1 | 7/2015 | Castillo et al. | |
| 2015/0201051 | A1 | 7/2015 | Belli | |
| 2015/0373448 | A1 | 12/2015 | Shaffer | |
| 2016/0112825 | A1* | 4/2016 | Miller | H04W 4/008 455/41.2 |
| 2016/0119708 | A1* | 4/2016 | Rodzevski | H04R 1/1041 381/74 |
| 2017/0238103 | A1* | 8/2017 | Gehring | H04R 25/552 381/23.1 |

OTHER PUBLICATIONS

Korean Patent Application No. 10-2016-0069780—Notice of Preliminary Rejection dated May 23, 2017.
Korean Patent Application No. 10-2016-0069780—Notice of Preliminary Rejection dated Feb. 27, 2018.
European Patent Application 16173105.4—First communication pursuant to Art. 94(3) EPC dated Mar. 22, 2018.

* cited by examiner

WIRELESS AUDIO OUTPUT DEVICES

CROSS-REFERENCE TO RELATED APPLICATIONS

This Application is a continuation of U.S. application Ser. No. 15/171,310, entitled "WIRELESS AUDIO OUTPUT DEVICES", filed Jun. 2, 2016, which claims the benefit of U.S. Provisional Application No. 62/171,376, entitled "Wireless Audio Devices", filed Jun. 5, 2015, the contents of both of which are incorporated by reference herein in their entireties for all purposes.

FIELD

The present technology pertains to communications devices, including to pairing of accessory devices, such as wireless audio output devices, for use with one or more companion wireless communications devices, such as sources of wireless audio data.

BACKGROUND

Headphones have long been used to play audio from electronic devices. More recently, wireless headphones have become more frequently used. Wireless headphones, however, that are known to an electronic device are tethered together. Additionally, wireless headphones that are known to an electronic device can be freely placed into a discovery mode that could be used to communicatively couple the wireless headphones with a new electronic device without erasing existing connection history.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining when to couple a pair of un-tethered wireless ear buds and determining when to erase connection history on the wireless ear buds.

Some embodiments of the present technology involve a wireless ear bud case for housing a pair of wireless ear buds and further containing a processor, a network interface, and a user input for determining when to communicatively couple the wireless ear buds and when to erase connection history on the wireless ear buds. The wireless ear buds can also include a network interface and a memory location that stores a device address, a paired partner device address (if applicable), and a companion communication device connection history. The processor can inspect a memory location on the wireless ear buds, via the network interface, to determine whether the wireless ear buds store corresponding paired partner device addresses with one another.

When the wireless ear buds have corresponding paired partner device addresses stored for one another, the wireless ear bud case can determine that the wireless ear buds are already communicatively coupled to each other. Alternatively, when the wireless ear buds do not have corresponding paired partner device addresses stored for one another, the wireless ear bud case can determine that the wireless ear buds are not already communicatively coupled to each other. Additionally, the wireless ear buds themselves can determine whether they are communicatively coupled with each other.

The wireless ear bud case can also detect an input that requests that the first wireless ear bud communicatively couple with the second wireless ear bud and to allow the first wireless ear bud to be discoverable by a companion communication device. When a request is received to pair the wireless ear buds with the companion communication device, the wireless ear buds communicatively couple with one another, and the wireless ear bud case erases any wireless link keys stored on the wireless ear buds. Also, the wireless ear bud case associates the device addresses as paired partner device addresses to indicate that the wireless ear buds are already communicatively coupled. Additionally, the wireless ear buds can store a link key for pairing with the companion communication device.

Some embodiments of the present technology involve systems, methods, and non-transitory computer-readable storage media for communicatively coupling a pair of untethered, wireless ear buds. In some implementations, communicatively coupling wireless ear buds involves detecting a button being pushed on a wireless ear bud case, inspecting firmware of both wireless ear buds housed within the wireless ear bud case, and selecting the wireless ear bud that includes the more recent firmware as the primary wireless ear bud. The primary wireless ear bud can be disconnected from any existing connections to one or more other wireless ear buds and/or to other communication devices, and a pairing mode can be enabled to pair the primary wireless ear bud with a companion communication device. After determining that the primary wireless ear bud has successfully paired with a companion communication device, the wireless ear bud case can cause the primary wireless ear bud to send to a secondary wireless ear bud the more recent firmware and cause the secondary wireless ear bud to enter a communicative coupling mode, thereby erasing any user history data associated with one or more previously paired devices. Next, the wireless ear bud case can cause the primary wireless ear bud to wirelessly communicatively couple to the secondary wireless ear bud, store address information (such as a Media Access Control (MAC) address and/or link keys) for the secondary wireless ear bud on the primary wireless ear bud, and store address information for the primary wireless ear bud on the secondary wireless ear bud.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for untethered wireless ear buds and a wireless ear bud case that facilitates managing the wireless ear buds, including determining when to erase connection history on either or both of the wireless ear buds, e.g., to protect user privacy.

The present technology involves systems, methods, and non-transitory media containing instructions that, when executed by a processor, cause performance of methods that allow a pair of untethered, wireless ear buds to be coupled with one another and to be made discoverable to other communication devices, such as to one or more companion communication devices. Additionally, the present technology can prevent exposing, e.g., inadvertently, a connection history of the wireless ear buds.

According to the present technology, the wireless ear buds can pair with a companion communication device (e.g. a computer, a smartphone, a tablet computer, a smart watch, or the like) via a wireless communication protocol (e.g., via Bluetooth®). In some cases, only a primary wireless ear bud is paired with the companion communication device. In such cases, the wireless ear buds can be communicatively coupled to each other so that audio received from the companion communication device by the primary wireless ear bud can be shared with the communicatively coupled secondary wireless ear bud. In some cases, the wireless ear buds do not include an input mechanism, such as a button that can be pressed, through which a user could indicate intent to communicatively couple together a pair of the wireless ear buds. In such cases, another action can be used to indicate the user's intent to communicatively couple together the pair of wireless ear buds. For example, a wireless ear bud case can house the pair of wireless ear buds, and the wireless ear bud case can be configured to communicatively couple the wireless ear buds to each other and to cause the wireless ear buds to be discoverable by and paired to a companion communication device. In some embodiments, the wireless ear bud case includes one or more input mechanisms by which the user can indicate intent to pair the wireless ear buds together and/or to place one or both of the wireless ear buds in a discovery mode to be paired with a companion communication device.

Figure 1A:
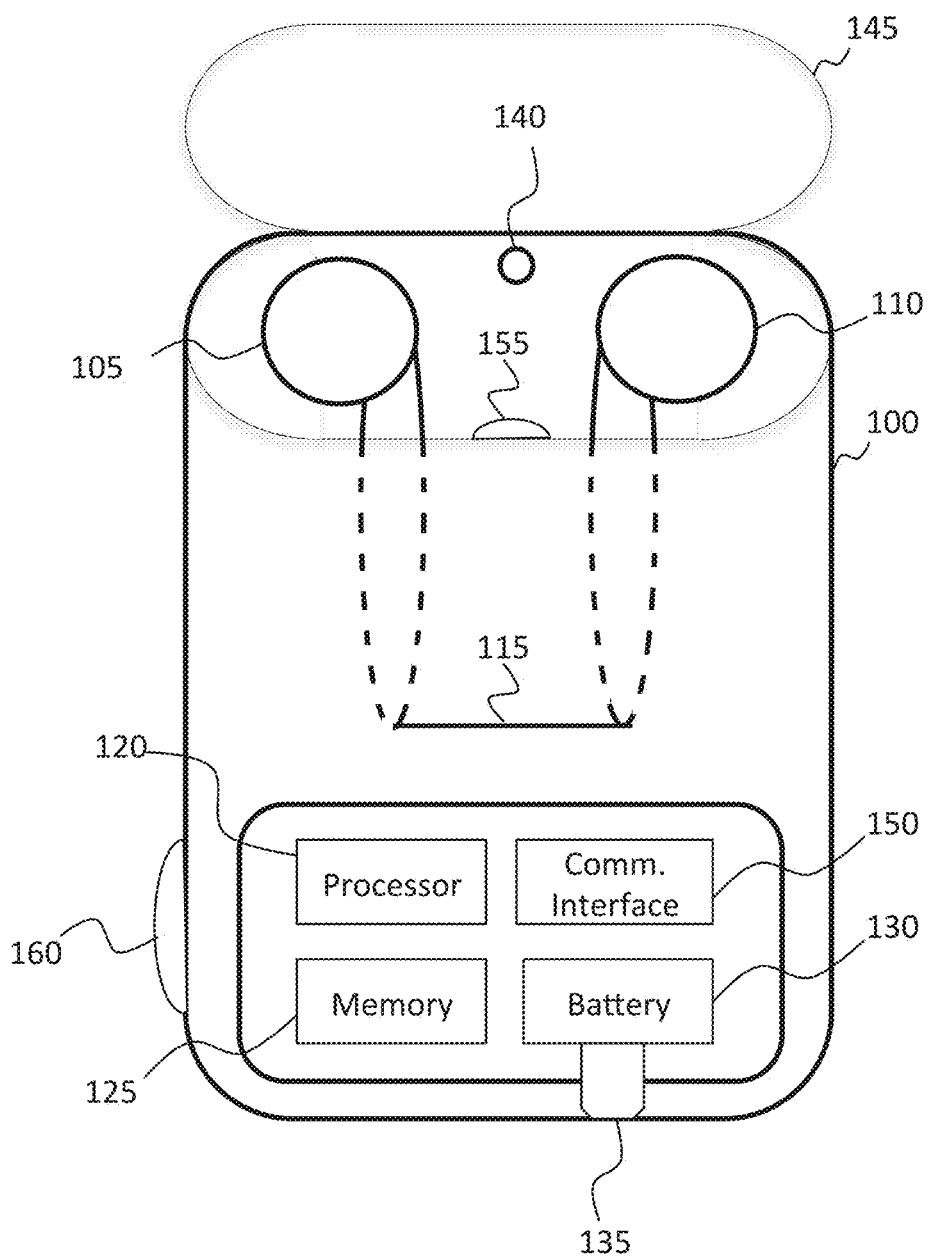
FIG. 1A illustrates an example wireless ear bud case according to some embodiments of the present technology.

FIG. 1A illustrates an example wireless ear bud case 100 according to some embodiments of the present technology. The wireless ear bud case 100 houses a pair of wireless ear buds 105, 110 and connects the wireless ear buds 105, 110 to each other while housed within the wireless ear bud case 100. The wireless ear bud case 100 can include a cover 145 that closes to cover the wireless ear buds within the wireless ear bud case 100, and the wireless ear bud case 100 can include a sensor 155 that detects when the cover 145 of the wireless ear bud case 100 is opened and/or closed.

The wireless ear bud case 100 also includes a processor 120, memory 125, and a communication interface 150. As explained in greater detail below, the wireless ear buds 105, 110 also include a communication interface, and the wireless ear bud case 100 can be used to create a communication link 115 between the wireless ear buds 105, 110 via the communication interface 150 of the wireless ear bud case 100.

In some embodiments, the communication link 115 is used as a physical communication link between the wireless ear buds 105, 110, and a shared secret is sent between the wireless ear buds 105, 110 during a secure wireless communicative coupling to each other to prevent a bad actor from maliciously communicatively coupling to either of the wireless ear buds 105, 110 over the air.

The wireless ear bud case 100 includes a battery 130 for re-charging the wireless ear buds 105, 110 and a charging interface 135 for connecting the battery 130 to a power source. The wireless ear bud case 100 can also include an indicator 140 to show a charge status of the wireless ear buds 105, 110 and/or of the wireless ear bud case 100. The wireless ear bud case 100 also can include an input mechanism 160, such as a button. As explained in greater detail below, the input mechanism 160 can be used to communicatively couple together the pair of wireless ear buds 105, 110 housed within the wireless ear bud case 100.

Figure 1B:
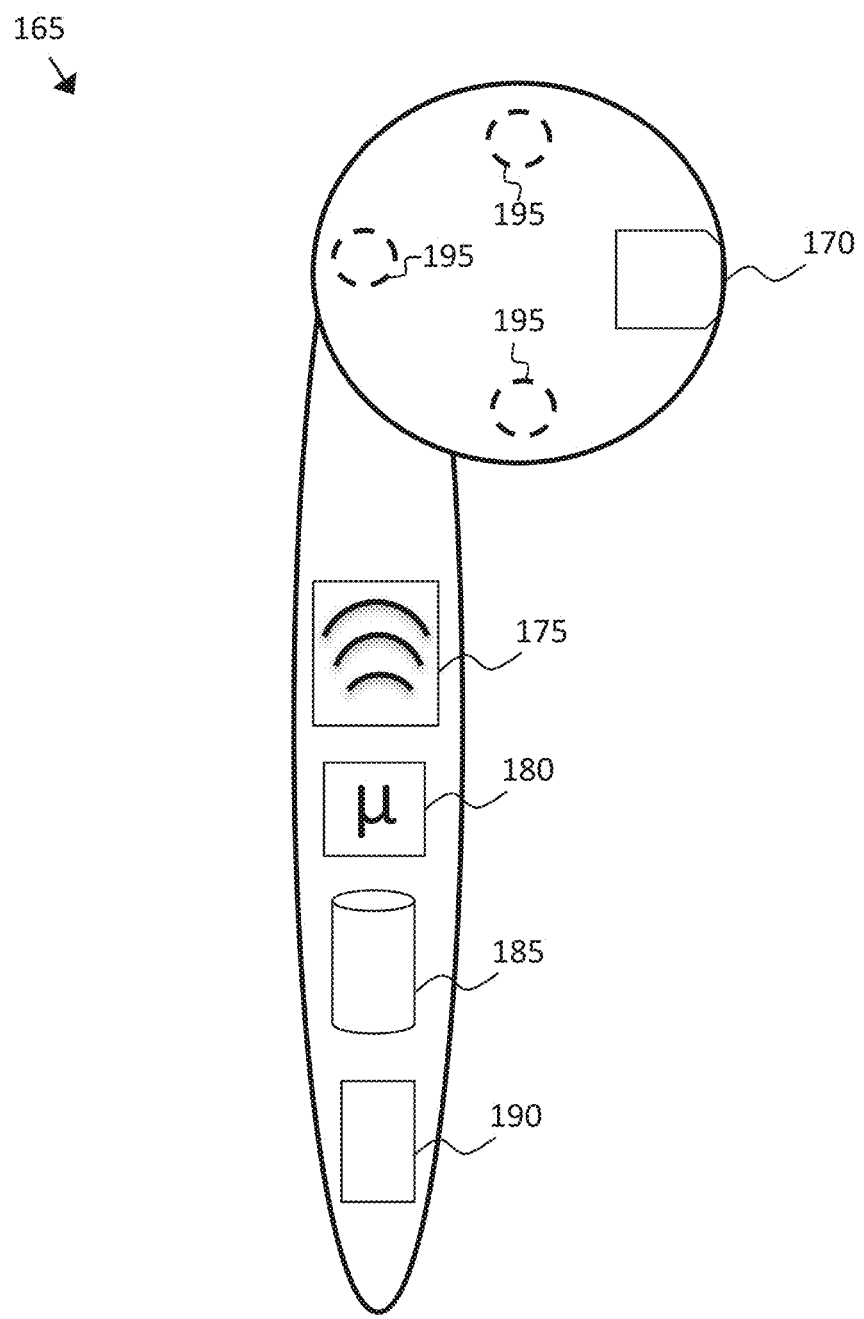
FIG. 1B illustrates an example wireless ear bud that can communicatively couple with another wireless ear bud to form a pair of untethered, wireless ear buds according to some embodiments of the present technology.

FIG. 1B illustrates an example wireless ear bud 165 that can communicatively couple with another wireless ear bud to form a pair of untethered, wireless ear buds according to some embodiments of the present technology. The wireless ear bud 165 includes a communication interface 175 used to communicatively couple with another wireless ear bud and to pair with a source device, e.g., a companion communication device that can provide audio data that the wireless ear bud(s) 165 can reproduce as audio signals for a user of the wireless ear bud(s) 165. In some embodiments, a process of pairing the wireless ear bud 165 is initiated when the wireless ear bud 165 is contained within a housing/case, e.g., the wireless ear bud case 100. In some circumstances, once a pairing mode is enabled for the wireless ear bud 165, the wireless ear bud 165 remains in the enabled pairing mode until one or more of the following occurs: (i) the wireless ear bud 165 pairs with a companion communication device, (ii) a pairing mode of the wireless ear bud 165 times out (e.g., the wireless ear bud 165 does not pair with a companion communication device within a fixed time period, such as thirty seconds), (iii) the wireless ear bud 165 and/or another wireless ear bud with which the wireless ear bud 165 is paired is removed from the wireless ear bud case 100, (iv) the wireless ear bud case 100 commands one or more both of the wireless ear buds 165 to exit the pairing mode, or (v) the companion communication device commands the wireless ear bud 165 to exit the pairing mode. The wireless ear bud 165 can also include a battery 190 and one or more sensors 195 for detecting a wearing status of the wireless ear bud 165, e.g., when the wireless ear bud 165 is placed in and/or removed from an ear, whether the wireless ear bud 165 is in a user's ear, e.g., an in-ear wearing status, or is not in a user's ear, e.g., an out-of-ear wearing status.

Additionally, the wireless ear bud 165 includes an audio output 170 for converting a received signal, e.g., which can include audio data, into audible sound. The signal can be received from a paired companion communication device (not shown) via the communication interface 175. The wireless ear bud 165 also includes a processor 180 and memory 185. The memory 185 in the wireless ear bud 165 stores firmware for operating the wireless ear bud 165 as well as data for coupling with other wireless ear buds and for pairing the wireless ear bud 165 with companion communication devices. For example, the memory 185 in the wireless ear bud 165 can store a connection history for companion communication devices with which the wireless ear bud 165 has previously paired. The connection history can include data for automatically pairing the wireless ear bud 165 with the companion communication device without having to configure a connection between the wireless ear bud 165 and the companion communication device (e.g., enter a password, exchange shared secrets, etc.). For example, the connection history can include one or more link keys for connecting to a wireless network (e.g., Bluetooth link keys). The memory 185 of the wireless ear bud 165 can also store a MAC address that uniquely identifies the wireless ear bud 165 as well as store a paired partner MAC address of another wireless ear bud that has previously coupled with the wireless ear bud 165. The memory 185 also stores instructions that, when executed by the processor, causes the wireless ear bud 165 to communicatively couple with another wireless ear bud.

Figure 2:
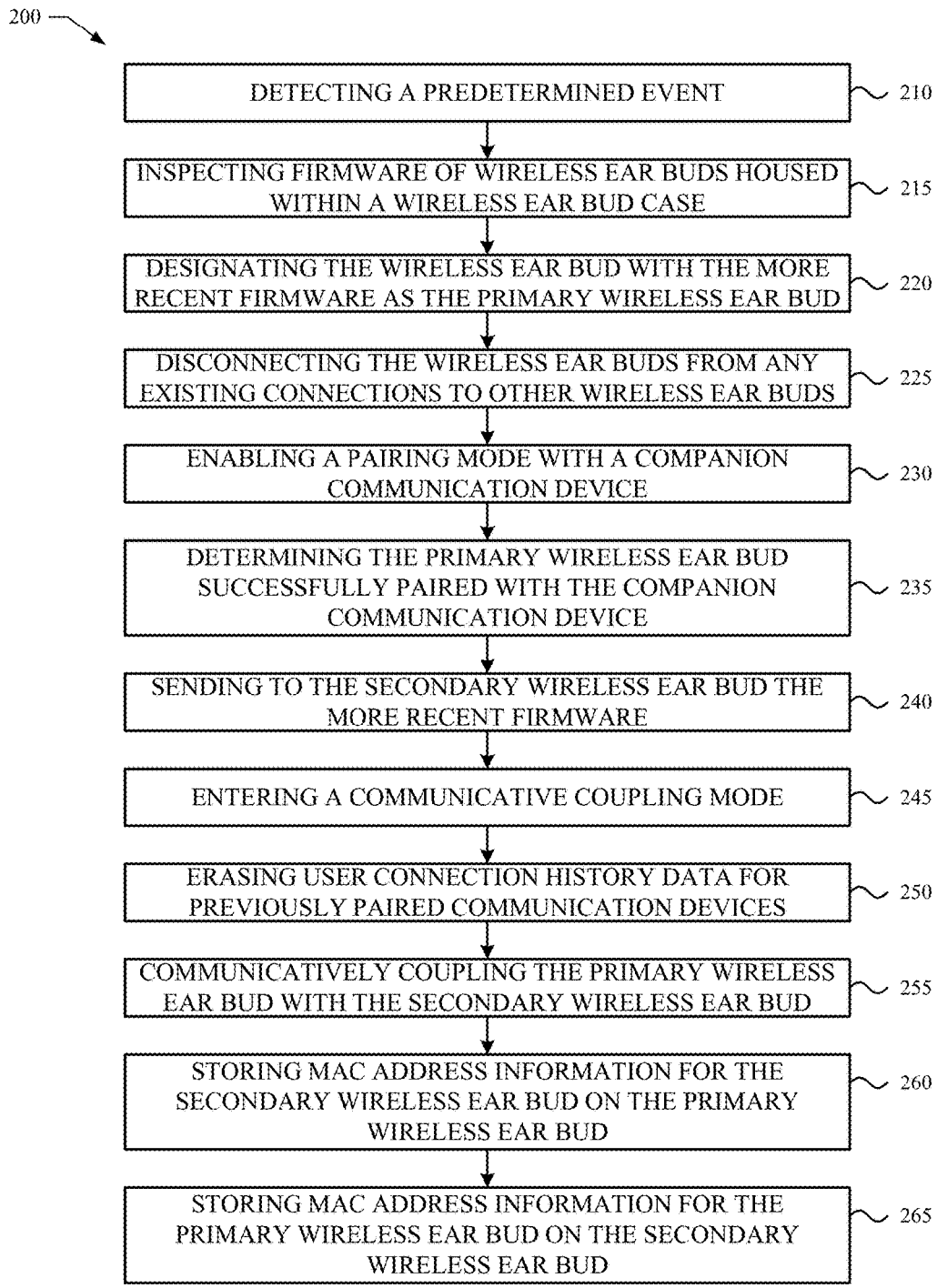
FIG. 2 illustrates an example method of communicatively coupling a pair of untethered, wireless ear buds according to some embodiments of the present technology.

FIG. 2 illustrates an example method 200 of communicatively coupling a pair of untethered, wireless ear buds according to some embodiments of the present technology. As discussed herein, in some cases, only a primary wireless ear bud is paired with a companion communication device, and the primary wireless ear bud communicatively couples with a secondary wireless ear bud so that audio data, received from the companion communication device by the primary wireless ear bud, is shared with the coupled secondary wireless ear bud via the primary wireless ear bud. The method 200 involves a wireless ear bud case detecting a predetermined event, at 210, (e.g., a button being pushed on the wireless ear bud case, the wireless ear bud case being opened, the wireless ear bud case being opened for the first time, determining that the wireless ear buds are within a predetermined threshold proximity of the wireless ear bud case and/or to each other, etc.). In response to detecting the predetermined event, the method 200 involves the wireless ear bud case inspecting the firmware of both wireless ear buds housed within the wireless ear bud case, at 215, and designating the wireless ear bud that has the more recent firmware as the primary wireless ear bud, at 220.

Next, at 225, the method 200 involves the wireless ear bud case causing the primary wireless ear bud to disconnect from any existing connections to other wireless ear buds, and the primary wireless ear bud enabling a pairing mode with a companion communication device, at 230. In some embodiments, the method 200 of communicatively coupling only continues when the primary wireless ear bud successfully pairs with a companion communication device to prevent accidentally coupling communication devices together. Accordingly, the method 200 involves the wireless ear bud case determining that the primary wireless ear bud has successfully paired with a companion communication device, at 235.

Next, the method 200 can involve the wireless ear bud case causing the primary wireless ear bud to send to the secondary wireless ear bud the more recent firmware, at 240, and to cause the secondary wireless ear bud to enter a communication coupling mode, such as a Bluetooth pairing mode, at 245. As explained further herein, in some embodiments of the present technology, the method 200 can involve the wireless ear bud case causing the primary wireless ear bud and the secondary wireless ear bud to erase any user connection history data for pairings with other communication devices that occurred before the current pairing mode with the companion communication device, at 250.

Next, the method 200 involves the wireless ear bud case causing the primary wireless ear bud to wirelessly communicatively couple to the secondary wireless ear bud, at 255, to store address information (e.g., a MAC address and/or link key information) for the secondary wireless ear bud on the primary wireless ear bud, at 260, and to store address information (e.g., a MAC address and/or link key information) for the primary wireless ear bud on the secondary wireless ear bud, at 265.

In some embodiments of the present technology, the stored address information for paired wireless ear buds can be used to determine whether wireless ear buds housed within a wireless ear bud case have been previously paired. As explained above, a wireless ear bud can store its own MAC address and can also store the MAC address for a previously paired partner wireless ear bud. Accordingly, the wireless ear bud case can determine when a paired partner MAC address for a first wireless ear bud matches the MAC address for a second wireless ear bud (and vice versa) to determine whether the wireless ear buds were previously paired.

Also, as discussed herein, the wireless ear bud can store a connection history for automatically pairing the wireless ear bud with a companion communication device in the future. However, this connection history stored in the wireless ear bud can result, in some cases, in allowing access to another person's private information when the connection history is permanently stored in the wireless ear bud and without determining when to erase the stored connection history data.

FIGS. 3A to 3I illustrate a variety of scenarios in which wireless ear buds housed together within a wireless ear bud case are either communication coupled or not communicatively coupled, and either have connection history data erased or not erased.

Figure 3A:
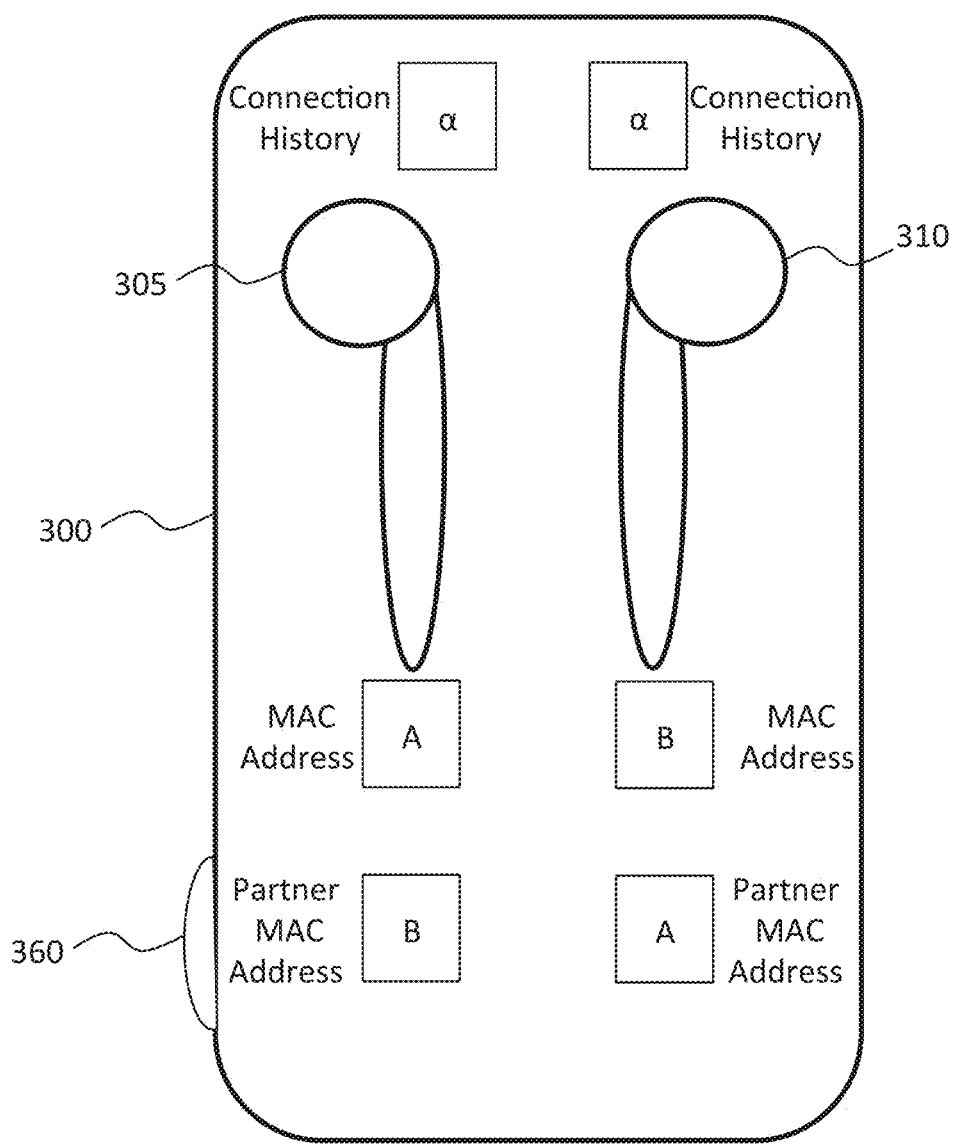
FIGS. 3A to 3I illustrate a variety of example scenarios in which wireless ear buds housed together within a wireless ear bud case are either communicatively coupled or not and either have connection history data erased or not.

FIG. 3A illustrates a first scenario in which wireless ear buds 305, 310 are housed within a wireless ear bud case 300. The wireless ear bud case 300 stores a MAC Address "A" and a Paired Partner MAC address "B" for wireless ear bud 305, and the wireless ear bud case 300 stores a MAC Address "B" and a Paired Partner MAC address "A" for wireless ear bud 310. Additionally, the wireless ear bud case 300 determines a connection history for connection "α" stored in wireless ear buds 305, 310. Finally, for the first scenario illustrated in FIG. 3A, the button 360 has not been pressed.

As the wireless ear buds 305, 310 have corresponding Paired Partner MAC addresses, the wireless ear bud case 300 can determine that the wireless ear buds 305, 310 have been previously paired together. Likewise, as the button 360 has not been pressed, the wireless ear bud case 300 does not cause the wireless ear buds 305, 310 to become discoverable to new connections with other communication devices.

Figure 3B:
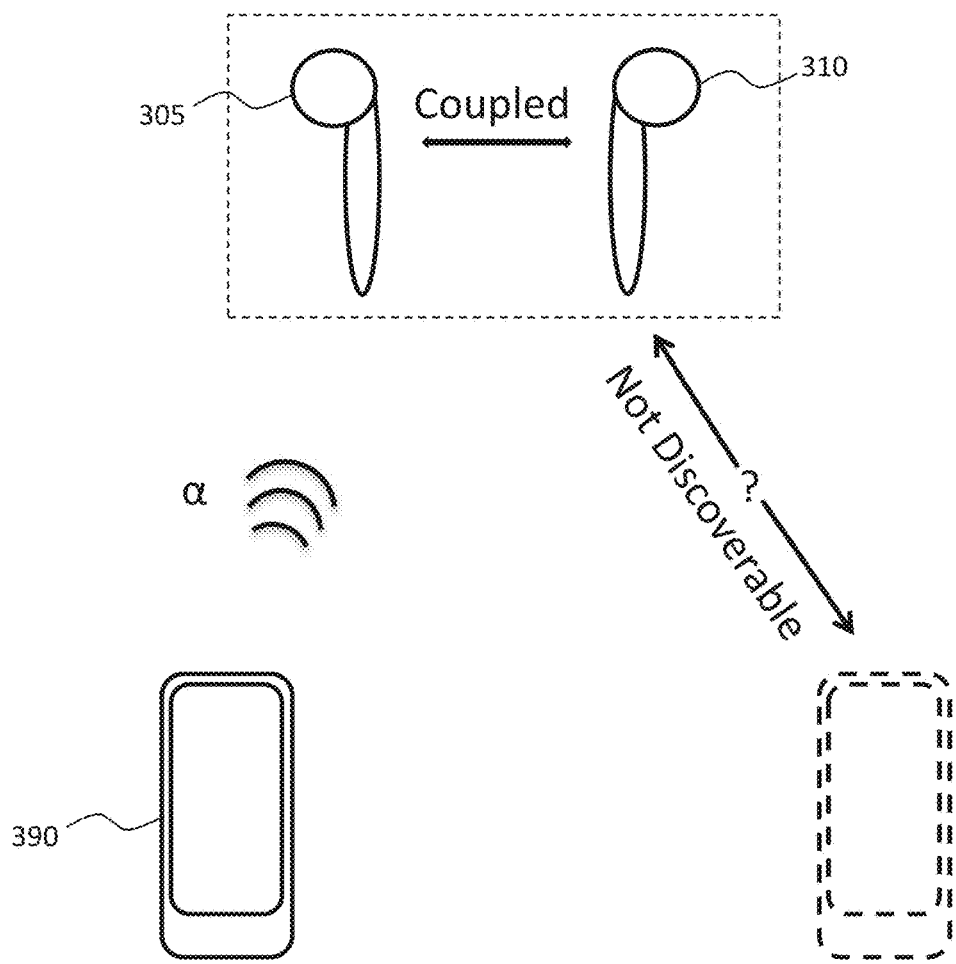

FIG. 3B illustrates a second scenario in which the wireless ear buds 305, 310 are removed from the wireless ear bud case 300. In this second scenario, because the wireless ear buds 305, 310 were previously paired to each other and button 360 of the wireless ear bud case 300 was not pushed, the wireless ear bud case 300 does not erase the connection history for connection "α", and the wireless ear buds 305, 310 can automatically connect to a companion communication device 390. In this second scenario, as the connection history is not erased and the wireless ear buds 305, 310 were previously paired together, the wireless ear buds 305, 310 are not discoverable to other communication devices to establish new connections.

Figure 3C:
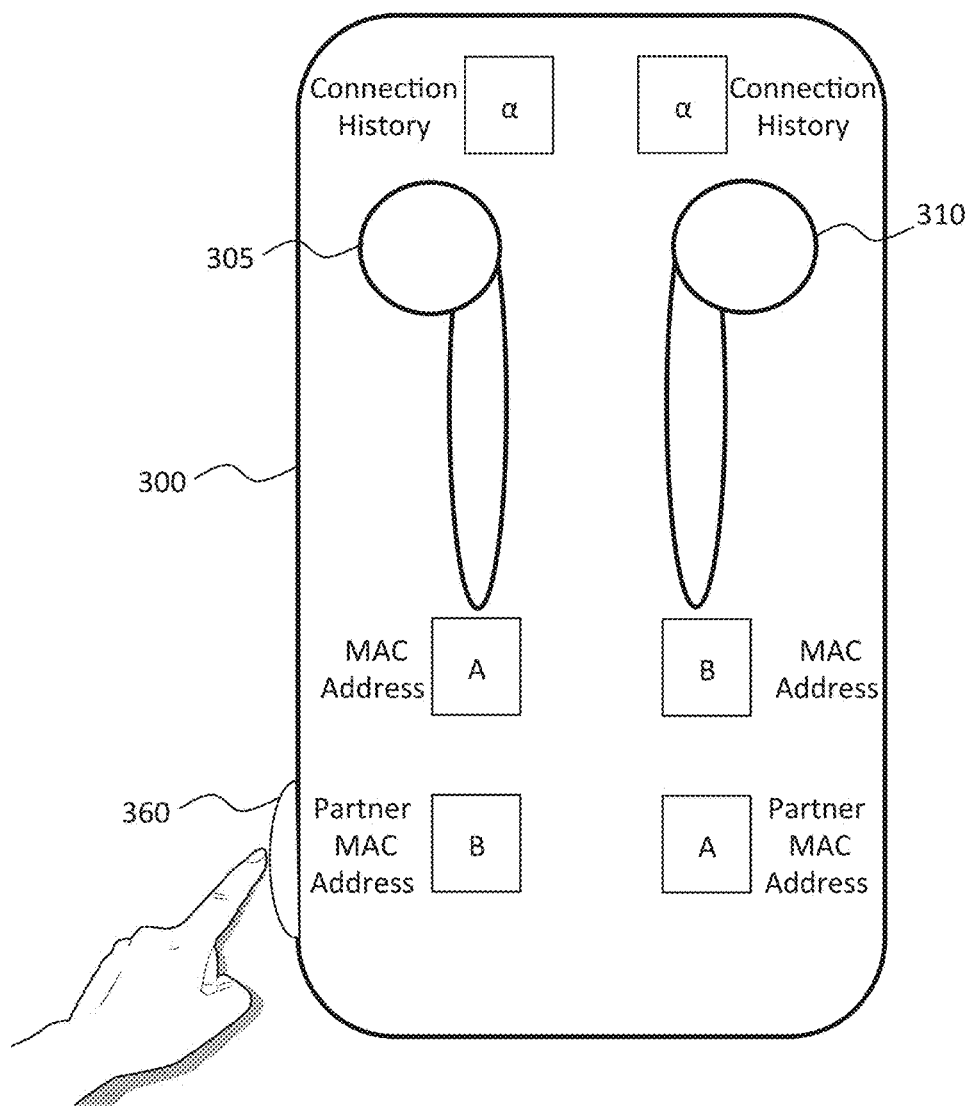

FIG. 3C illustrates a third scenario in which wireless ear buds 305, 310 are housed within a wireless ear bud case 300. The wireless ear bud case 300 has a MAC Address "A" and a Paired Partner MAC address "B" stored for wireless ear bud 305, and the wireless ear bud case 300 also has a MAC Address "B" and a Paired Partner MAC address "A" stored for wireless ear bud 310. Additionally, the wireless ear bud case 300 can determine a connection history for connection "α" stored in wireless ear buds 305, 310. Finally, for the scenario illustrated in FIG. 3C, the button 360 of the wireless ear bud case 300 has been pressed.

As the wireless ear buds 305, 310 have corresponding Paired Partner MAC addresses, the wireless ear bud case 300 can determine that the wireless ear buds 305, 310 have been previously paired together. However, unlike the first and second scenarios, as the button 360 has been pressed, the wireless ear bud case 300 causes the wireless ear buds 305, 310 to become discoverable to new connections with other communication devices.

Figure 3D:
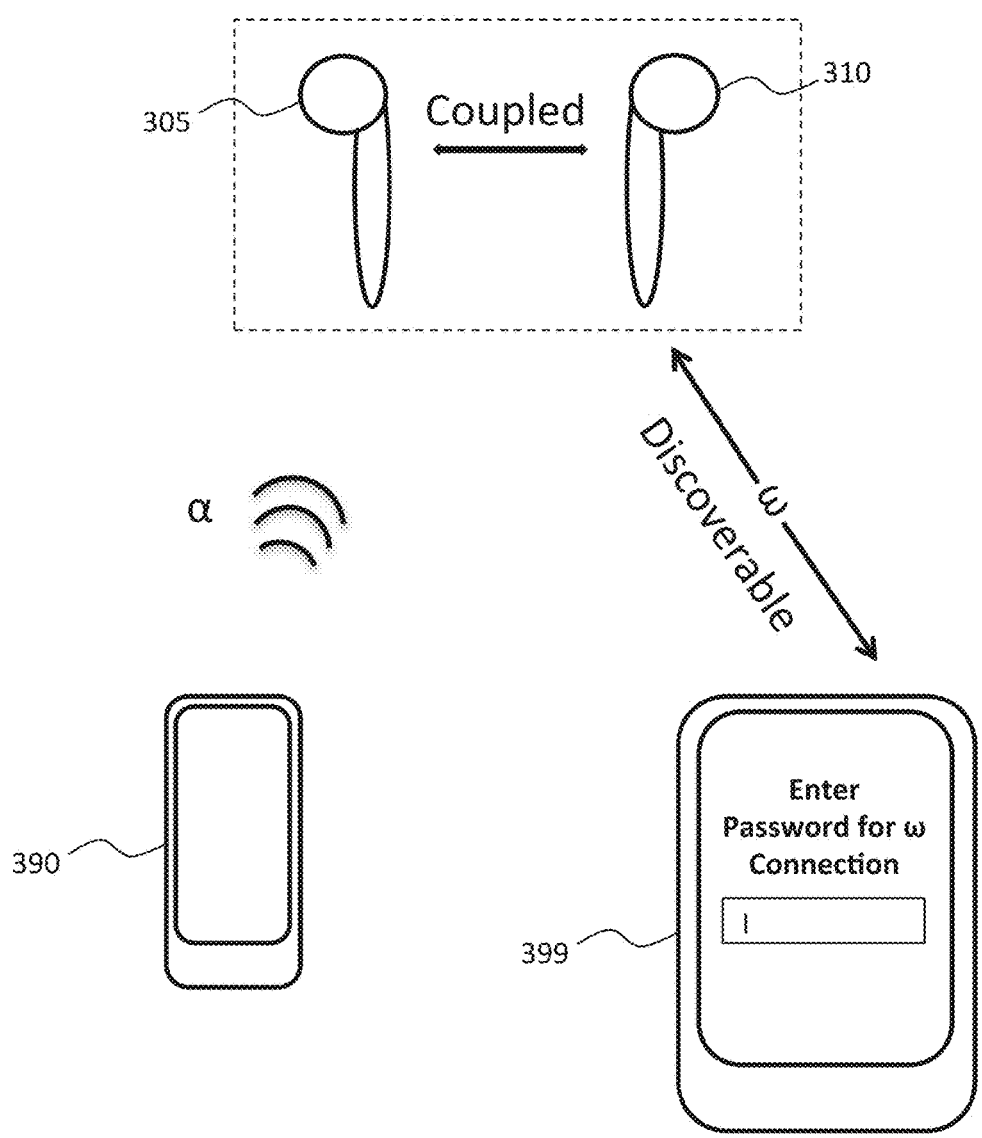

FIG. 3D illustrates a fourth scenario in which the wireless ear buds 305, 310 are removed from the wireless ear bud case 300, after the button 360 of the wireless ear bud case 300, from which the wireless ear buds 305, 310 are removed, is pressed. Despite the button 360 being pressed, the wireless ear buds 305, 310 were also previously paired together, and the wireless ear bud case 300 does not erase the connection history for connection "α". This policy decision avoids the connection history from being erased due to an unintentional button press of the button 360 of the wireless ear bud case 300. The wireless ear buds 305, 310 will automatically connect to a companion communication device 390. Additionally, as the button 360 of the wireless ear bud case 300 was pressed, the wireless ear buds 305, 310 are discoverable to new connections with other communication devices, such as to connection "ω" with companion communication device 399, e.g., upon a user entering appropriate credentials.

Figure 3E:
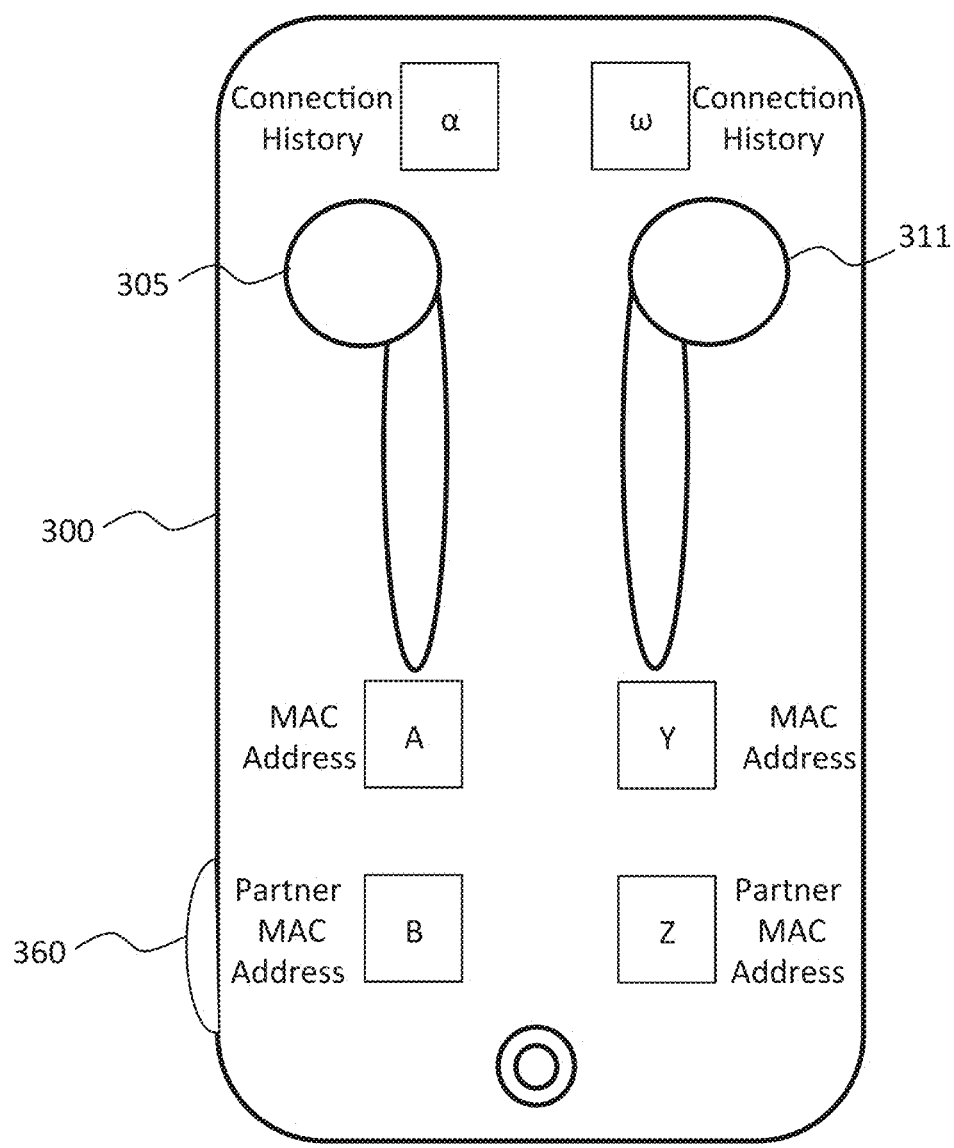

FIG. 3E illustrates a fifth scenario in which the wireless ear bud 305 is housed in the wireless ear bud case 300 with another wireless ear bud 311. The wireless ear bud case 300 has a MAC Address "A" and a Paired Partner MAC address "B" stored for wireless ear bud 305, and the wireless ear bud case 300 has a MAC Address "Y" and a Paired Partner MAC address "Z" stored for wireless ear bud 311.

As the wireless ear buds 305, 311 do not have corresponding Paired Partner MAC addresses, ("B" does not match "Y" for wireless ear bud 305, and "Z" does not match "A" for wireless ear bud 311), the wireless ear bud case 300 can determine that the wireless ear buds 305, 310 have not been previously paired (or have been previously paired and subsequently unpaired). The scenario illustrated in FIG. 3E can occur in a number of circumstances. For example, the scenario can occur when a first person asks a second person to use the first person's wireless ear bud case 300 to recharge the wireless ear bud 311. Also, a group of people can share multiple wireless ear buds. The scenario illustrated in FIG. 3E can also occur when a bad actor attempts to use another person's wireless ear bud to access their private communications. Therefore, the wireless ear bud case 300 can erase a connection history for wireless ear buds in certain circumstances.

For example, the wireless ear bud case 300 can have a connection history for connection "α" stored for wireless ear bud 305 and a connection history for connection "ω" stored for wireless ear bud 311. As wireless ear bud 311 is not be made discoverable unless the button 360 of the wireless ear bud case 300 is pressed, another user (such as a bad actor) will unable to pair wireless ear bud 305 with wireless ear bud 311 and use wireless ear bud 311 to access information using the "ω" connection histories unless the button 360 is pressed.

For the scenario illustrated in FIG. 3E, the button 360 of the wireless ear bud case 300 has not been pressed, so the wireless ear bud case 300 does not cause the wireless ear buds 305, 311 to be discoverable. Also, as the MAC address and Paired Partner MAC address for either wireless ear bud 305, 311 do not correspond, the wireless ear buds 305, 311 are not communicatively coupled together. In this scenario, therefore, a bad actor is unable to use the wireless ear bud 311, because the bad actor cannot discover the wireless ear bud 311.

Figure 3F:
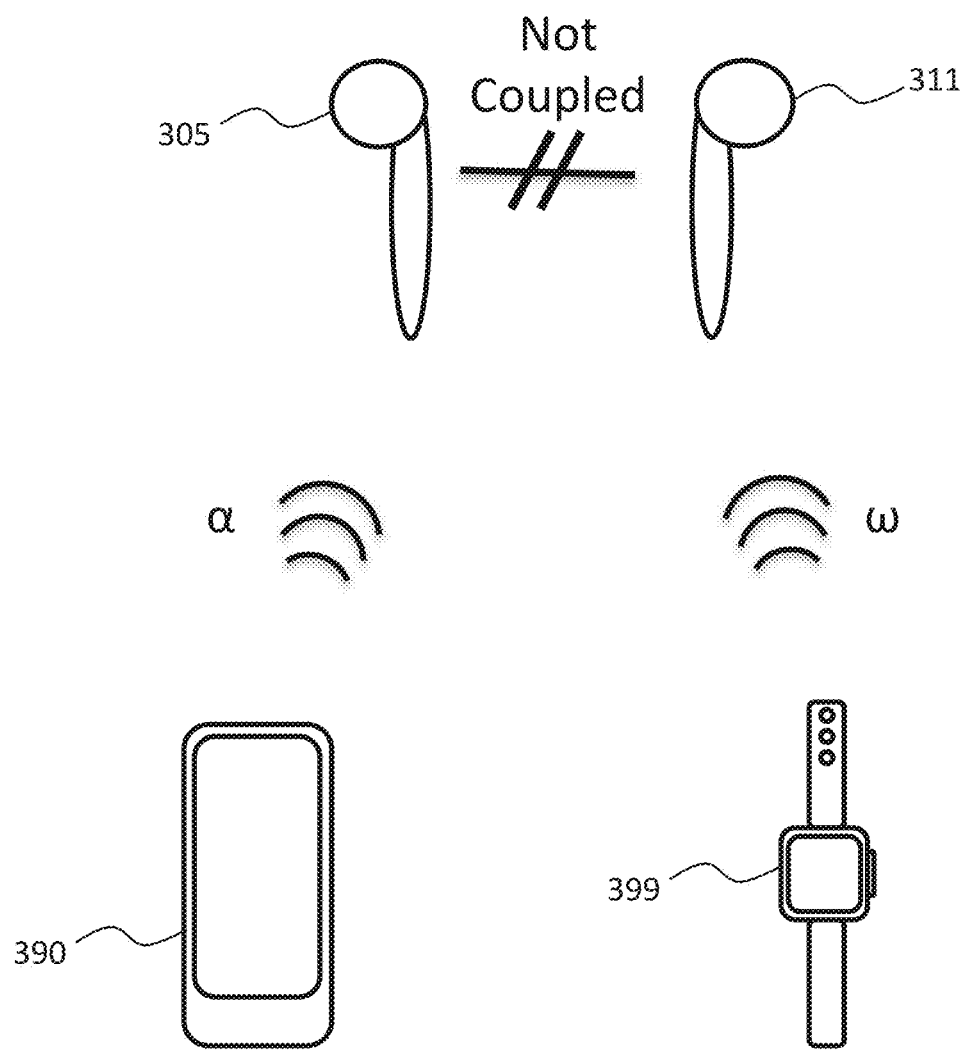

In a scenario as illustrated in FIG. 3F, however, the wireless ear bud 305 can be used with companion communication device 390 over connection "α", and the wireless ear bud 311 can be used with companion communication device 399 over connection "ω", thereby protecting a good actor from having to reconfigure connection "ω" just because the good actor used the wireless ear bud case 300 to charge the wireless ear bud 311. The wireless ear bud 311 can be charged in the wireless ear bud case 300 without losing a connection history for either wireless ear bud 305 or wireless ear bud 311, thereby allowing both wireless ear buds 305, 311 to be reused for previous connections.

Figure 3G:
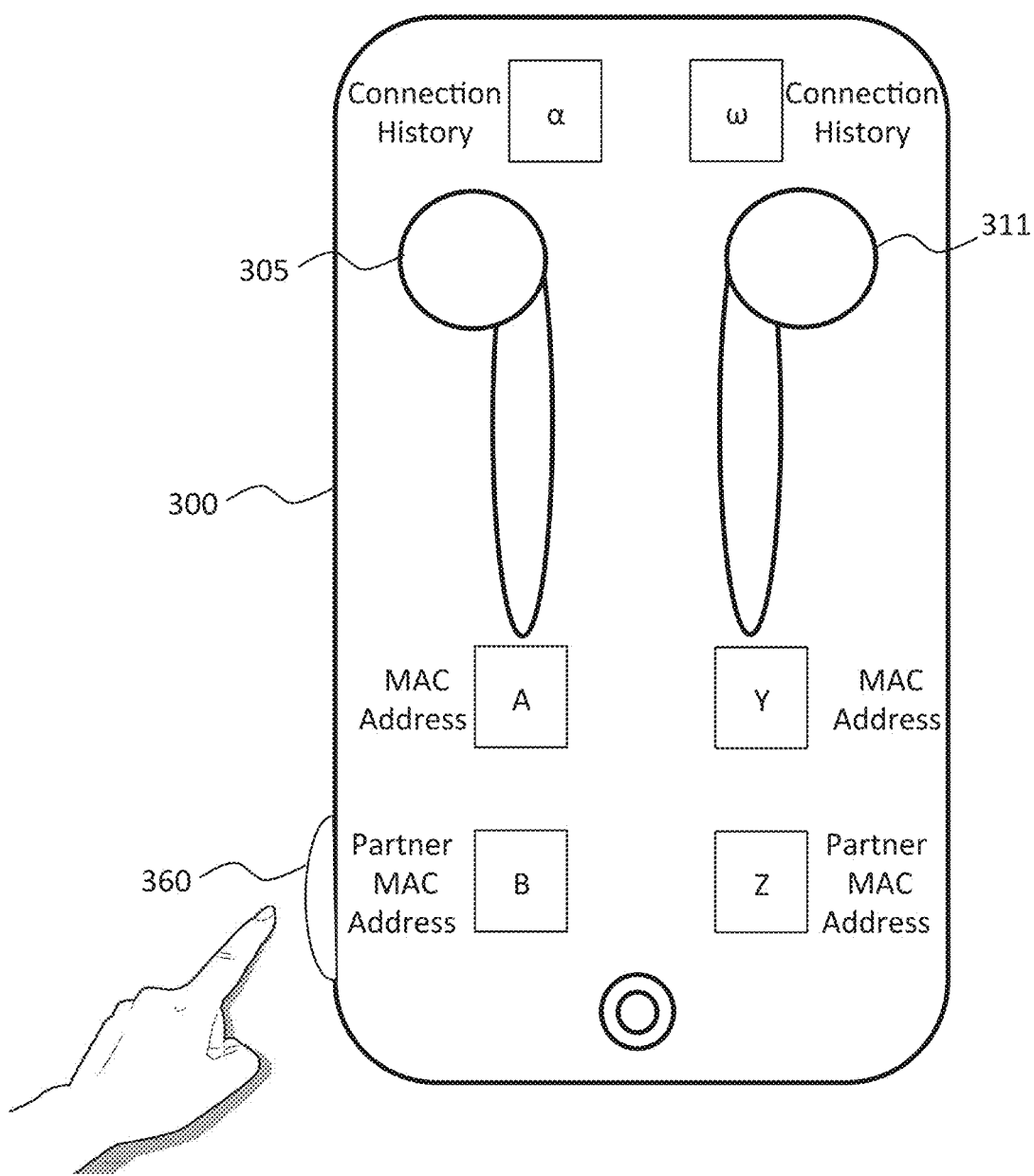
Figure 3H:
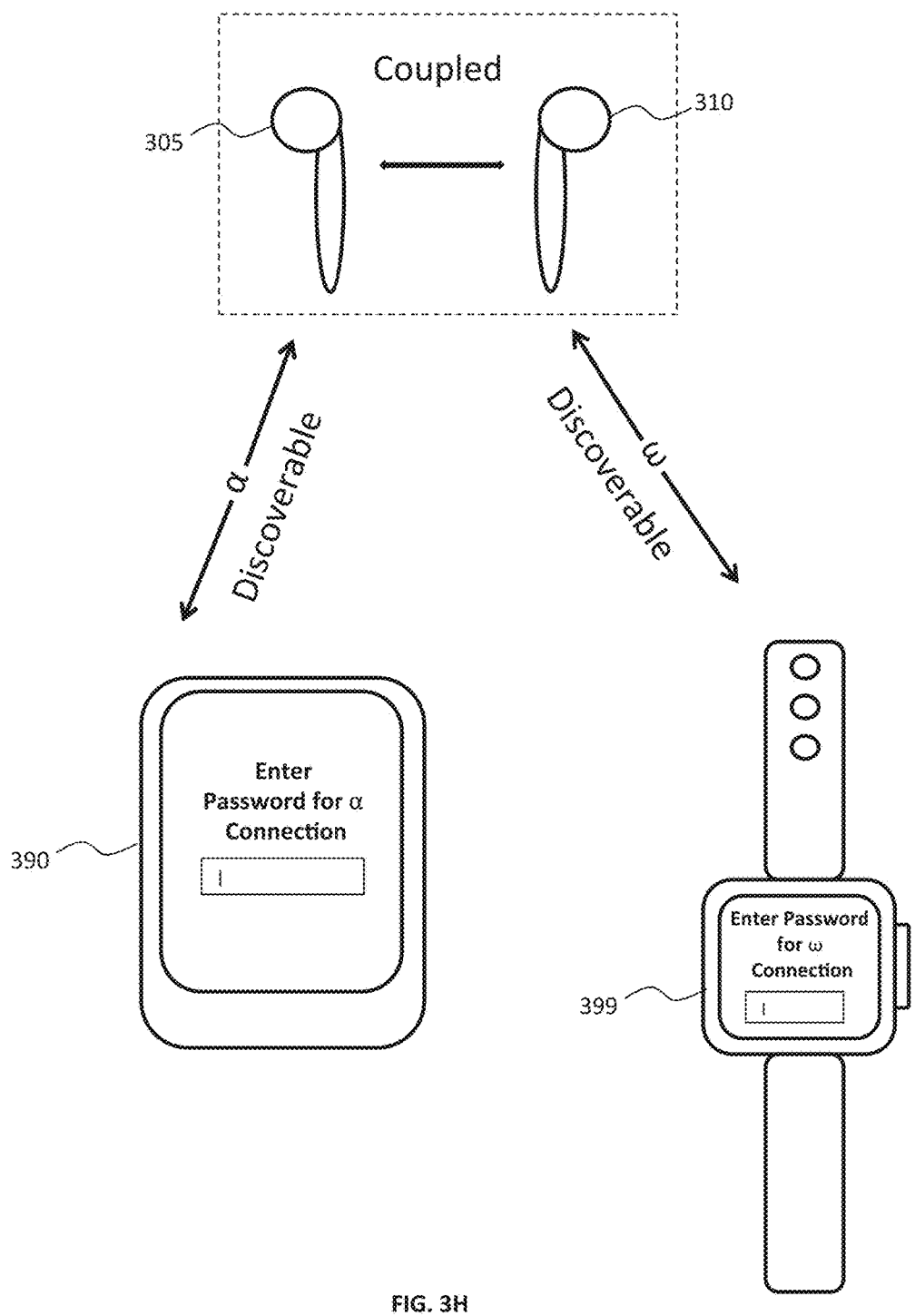
Figure 3I:
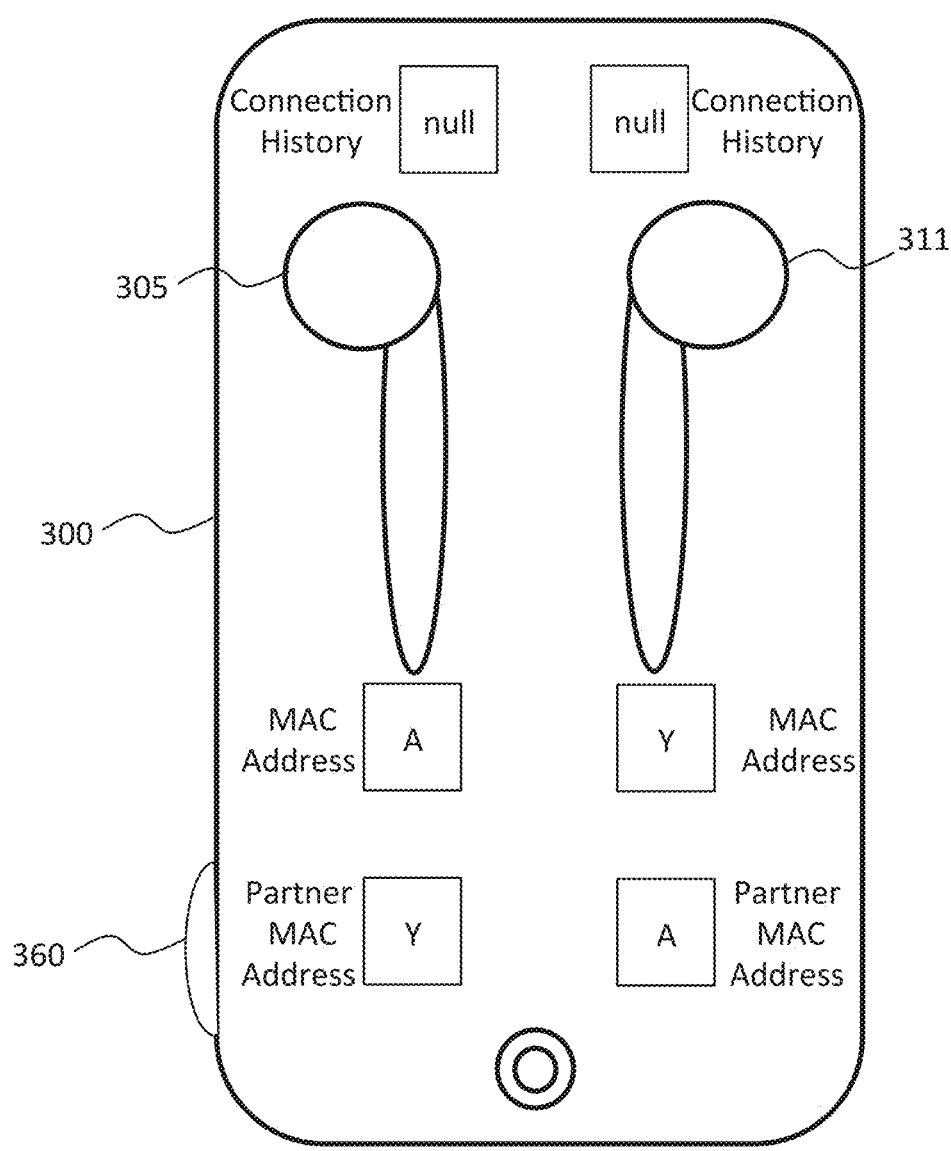

FIGS. 3G to 3I illustrate a scenario in which wireless ear bud 305 is housed in the wireless ear bud case 300 with wireless ear bud 311. As shown in FIG. 3F, the wireless ear bud case 300 has a MAC Address "A" and a Paired Partner MAC address "B" stored for wireless ear bud 305, and the wireless ear bud case 300 also has a MAC Address "Y" and a Paired Partner MAC address "Z" stored for wireless ear bud 311. As the wireless ear buds 305, 311 do not have corresponding Paired Partner MAC addresses, ("B" does not match "Y" for wireless ear bud 305, and "Z" does not match "A" for wireless ear bud 311), the wireless ear bud case 300 can determine that the wireless ear buds 305, 311 have not been previously paired (or have been previously paired and subsequently unpaired). Also, the wireless ear bud case 300 stores a connection history for connection "α" for wireless ear bud 305 and a connection history for connection "ω" for wireless ear bud 311. In this scenario, additionally as shown in FIG. 3G, the button 360 of the wireless ear bud case 300 has been pressed.

After the button 360 of the wireless ear bud case 300 has been pressed, one of the wireless ear buds 305, 311 initiates a communication coupling process (e.g., depending on which of the wireless ear buds 305, 311 is the primary wireless ear bud) and erases connection histories for both wireless ear bud 305 and wireless ear bud 311. Erasing the connection histories protects against unintended accessing of personal information from a wireless ear bud.

As shown in FIG. 3H, after the button 360 is pushed, the wireless ear buds 305, 311 do not automatically connect to companion communication device 390 or to companion communication device 399, because the connection history for connection "α" and the connection history for connection "ω" have been erased. However, the wireless ear buds 305, 311 are coupled to each other and are discoverable by companion communication device 390 and companion communication device 399. Also, as shown in FIG. 3I, after the button 360 is pressed, the wireless ear bud case 300 stores a MAC Address "A" and a Paired Partner MAC address "Y" for wireless ear bud 305, and the wireless ear bud case 300 stores a MAC Address "Y" and a Paired Partner MAC address "A" stored for wireless ear bud 311. Additionally, the connection histories for both wireless ear bud 305 and wireless ear bud 311 are erased.

Figure 4A:
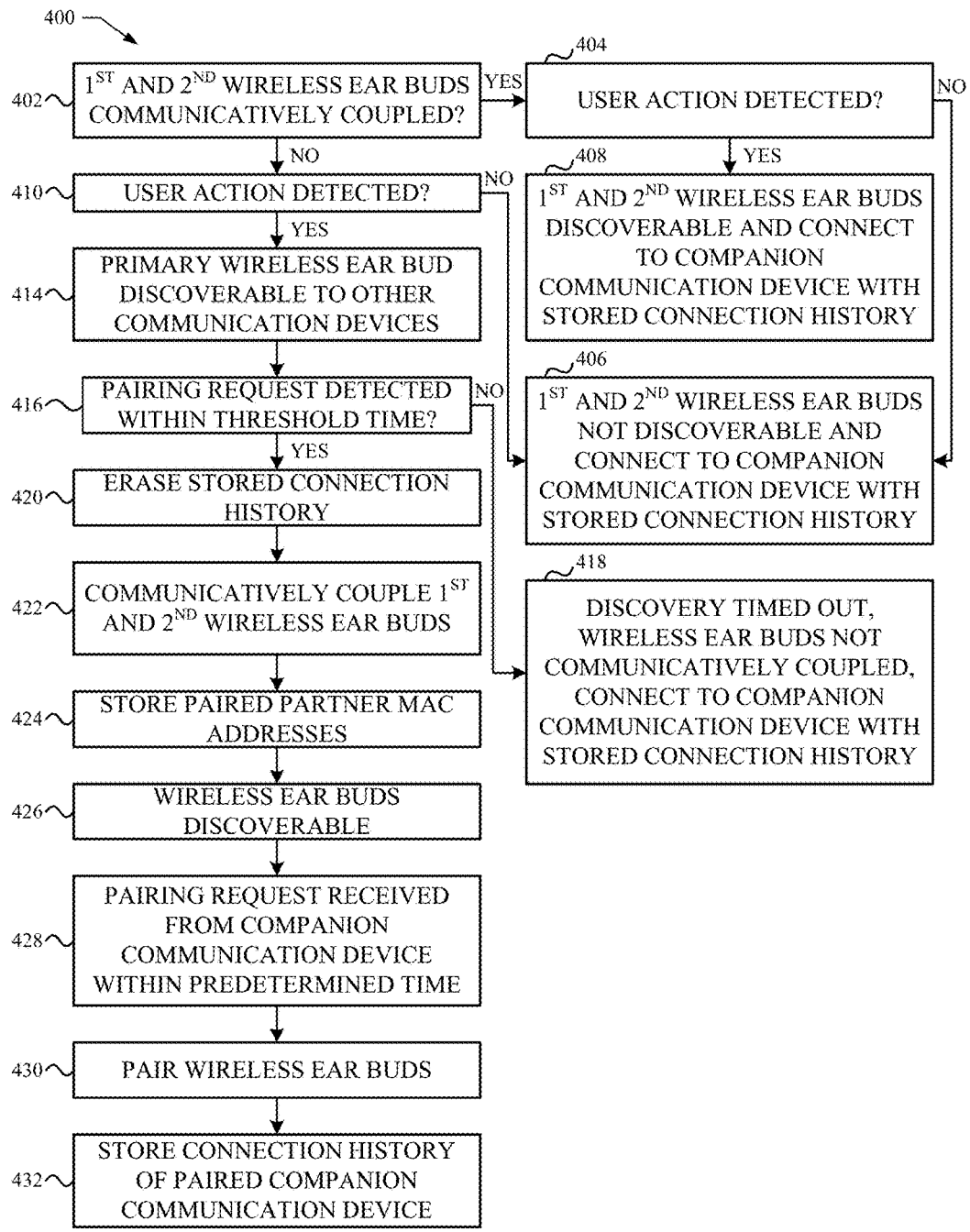
FIG. 4A illustrates an example method of determining when to communicatively couple wireless ear buds housed in a wireless ear bud case and when to make the wireless ear buds discoverable to other communication devices according to some embodiments of the present technology.

FIG. 4A illustrates a flow chart 400 of an example method to determine when to communicatively couple together wireless ear buds housed in a wireless ear bud case and when to make the wireless ear buds discoverable for connections to other communication devices, according to some embodiments of the present technology.

At 402, a wireless ear bud case determines whether a first wireless ear bud housed in the wireless ear bud case is already coupled to a second wireless ear bud also housed in the wireless ear bud case. For example, the wireless ear bud case can inspect a MAC address and a paired partner MAC address for each wireless ear bud housed in the wireless ear bud case to determine if the MAC addresses match. In other implementations, other connection information can be evaluated in addition to or in place of MAC addresses to determine whether the wireless ear buds housed in the wireless ear bud case are already communicatively coupled to each other. When the wireless ear buds are already communicatively coupled to each other, at 404, the wireless ear bud case determines whether a user has performed an action, (e.g., pushed a button on the wireless ear bud case), the action indicating that the user wants the wireless ear buds to be discoverable for connections to other communication devices. If not, at 406, the wireless ear bud case does not make the wireless ear buds discoverable, and the wireless ear buds will only connect to a companion communication device when the wireless ear buds have a connection history saved for the companion communication device. If the user has performed the required action, at 408, the wireless ear buds become discoverable to connections by other communication devices, and the wireless ear buds can automatically connect to a companion communication device when the wireless ear buds have a connection history saved for the companion communication device.

When the wireless ear buds are not already communicatively coupled to each other, at 410, the wireless ear bud case determines whether a user has performed an action, (e.g. pushed a button on the wireless ear bud case), to indicate that the user wants the wireless ear buds to be discoverable to establish connections with other communication devices. If not, at 406, (i) the wireless ear bud case does not cause the first wireless ear bud and the second wireless ear bud to be communicatively coupled to each other, (ii) the wireless ear bud case does not cause the wireless ear buds to become discoverable, and (iii) the wireless ear buds will connect to a companion communication device when the wireless ear buds have a connection history saved for the companion communication device.

On the other hand, if the user has performed the requisite action, at 414, the wireless ear bud case causes at least one of the wireless ear buds, e.g., a primary wireless ear bud, to become discoverable to companion communication devices. In some circumstances, a discovery mode can time out when a request to pair is not received by the at least one of the wireless ear buds from a companion communication device by an expiration time. The time out of the discovery mode can prevent the wireless ear buds from remaining in a pairing mode, e.g., when a user accidently pushes the button on the wireless ear bud case. At 416, the wireless ear buds determine whether a pairing request is received within a predetermined threshold time. If not, at 418, the discovery mode times out, and the wireless ear buds will connect to a companion communication device, when the wireless ear buds have a connection history saved for the companion communication device.

When a pairing request is received by at leas tone of the wireless ear buds, e.g., by a primary wireless ear bud, within a predetermined threshold time, at 420, the connection history for the wireless ear buds is erased. At 422, the wireless ear bud case causes the first wireless ear bud and second wireless ear bud to become communicatively coupled to each other. At 424, the wireless ear bud case causes the wireless ear buds to store the paired partner MAC address for each other. Further, at 426, the communicatively coupled pair of wireless ear buds is made discoverable to other communication devices. At 428, a pairing request is received from a companion communication device within a predetermined time. At 430, the wireless ear buds are paired with the companion communication device. At 432, a connection history is stored for the paired companion communication device.

Figure 4B:
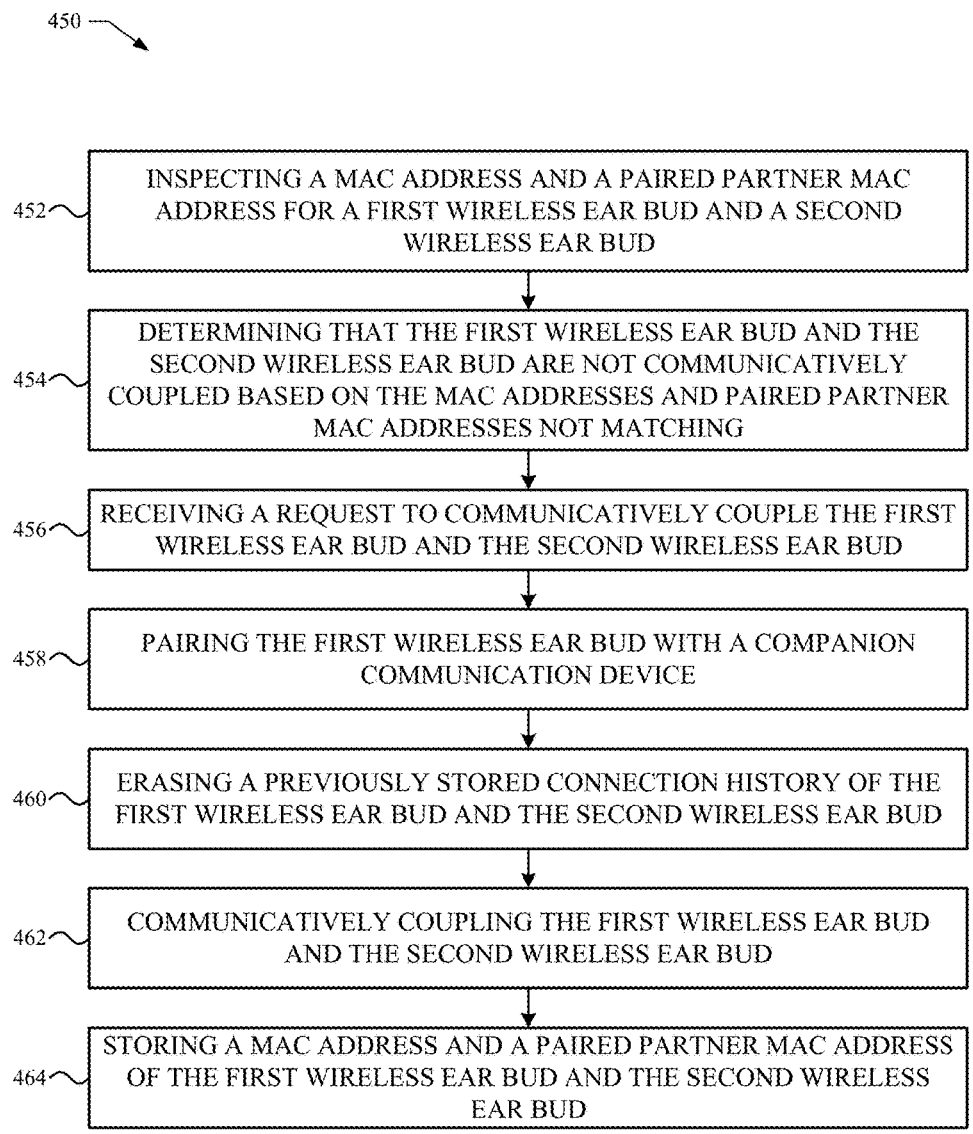
FIG. 4B illustrates an example method of determining to erase a connection history and to communicatively couple wireless ear buds in a wireless ear bud case according to some embodiments of the present technology.

FIG. 4B illustrates a flow chart 450 of another example method to determine to erase a connection history and to communicatively couple wireless ear buds together, in accordance with some embodiments of the present technology. At 452, the method includes inspecting a MAC address and a Paired Partner MAC address for a first wireless ear bud and for a second wireless ear bud. At 454, the method includes determining that the first wireless ear bud and the second wireless ear bud are not communicatively coupled together, e.g., based on the MAC addresses and Paired Partner MAC Addresses not matching. Next, at 456, the method includes receiving a request to communicatively couple the first wireless ear bud and second wireless ear bud. For example, receiving a request to communicatively couple the first wireless ear bud and second wireless ear bud can involve one or more of: (i) the wireless ear bud case detecting a user pressing a button on the wireless ear bud case, (ii) a sensor on the case detecting that the wireless ear bud case is first opened, or (iii) detecting a pairing polling request from another communication device within a threshold proximity to the wireless ear bud case.

At 458, the method includes receiving a request to pair the first wireless ear bud with a companion communication device. At 460, the method further includes erasing previous connection histories of the first wireless ear bud and second wireless ear bud that were previously stored. At 462, the method further includes communicatively coupling the first wireless ear bud and second wireless ear bud to each other. At 464, the method further includes storing a MAC address and a Paired Partner MAC address of the first wireless ear bud and the second wireless ear bud. In some implementations, the method can include modifications to the order of actions, and one or more actions can be omitted, modified, or replaced with substitute actions.

As explained above, a pair of communicatively coupled wireless ear buds can involve a primary wireless ear bud that is paired with a companion communication device and a secondary wireless ear bud that does not pair directly with the companion communication device. Instead, the primary wireless ear bud receives audio data from the companion communication device and routes the audio data to the secondary wireless ear bud. In some embodiments of the present technology, the primary wireless ear bud and the secondary wireless ear bud can swap roles.

In some embodiments, the wireless ear buds perform a coordinated role swap. For example, a coordinated role swap can occur when a secondary wireless ear bud is placed in a user's ear, while the primary wireless ear bud is not placed in a user's ear (e.g., as detected by sensors 195). In another example, a pair of wireless ear buds can perform a coordinated swap when a primary wireless ear bud's battery level is low and the primary wireless ear bud transfers its role to a secondary wireless ear bud, which becomes the primary wireless ear bud, while the primary wireless ear bud becomes the secondary wireless ear bud in the pair of wireless ear buds. In some cases, the wireless ear buds will not swap roles during a connection event (e.g., during a phone call). Also, in some cases, the wireless ear buds will not swap roles during a firmware update.

The wireless ear buds can also perform an uncoordinated swap that occurs when a wireless ear bud changes its wireless ear bud role while the other wireless ear bud is not connected. This uncoordinated swap will occur when a primary wireless ear bud becomes a secondary wireless ear bud or when a secondary wireless ear bud becomes a primary wireless ear bud. For example, if a primary wireless ear bud connects to a source (e.g., a smartphone, a smart watch, etc.), and the source rejects the connection due to an error indicating that the source is already connected to an other wireless ear bud, the primary wireless ear bud will become a secondary wireless ear bud and will try to find the other wireless ear bud. In another example, a secondary wireless ear bud will try to connect to a primary wireless ear bud for a predetermined number of times (e.g., three times) and, if the secondary wireless ear bud cannot find the primary wireless ear bud after trying for the predetermined number of times, the secondary wireless ear bud will swap to become the primary wireless ear bud. Also, in some cases, if the secondary wireless ear bud is placed in-ear, it will immediately swap to be the primary wireless ear bud, if the secondary wireless ear bud has tried at least one time to find the primary wireless ear bud. Also, a wireless ear bud case can command either wireless ear bud (the primary wireless ear bud or the secondary wireless ear bud) to change its role to facilitate scenarios where two wireless ear buds are assigned the same role.

Additionally, a user can disable a swap of roles between wireless ear buds by changing a capability of a wireless ear bud, e.g., by forcing a wireless ear bud to enable a microphone capability. In some cases, the wireless ear bud will not enable the microphone capability until the user explicitly chooses this option.

For example, in some cases, a user will select a wireless ear bud (of a pair of wireless ear buds) to enable a microphone capability of the selected wireless ear bud. This selected wireless ear bud can be referred to as a Mic-Bud. The other wireless ear bud can be referred to as the Mute-Bud. The Mute-Bud will always try to connect to the Mic-Bud. If it does not find the Mic-Bud, the Mute-Bud will then try to connect to a last known communication device (a smart phone, a smart watch, etc.). If the Mute-Bud connects to a communication device, the Mute-Bud will not connect using a voice profile (as the Mute-Bud is configured in a "mute" non-voice mode). The user can, through an operating system, e.g., via an interface of the connected device, change configurations so that the Mute-Bud becomes the Mic-Bud. If selected, the Mic-Bud will connect to the communication device using a voice profile. Also, wireless ear buds can include a sensor to detect taps, and a tap control can be used to answer a phone call using the wireless ear bud when paired with a companion communication device, e.g., with a phone. When the tap control is used to answer a call with the Mute-Bud, the Mute-Bud will automatically become the Mic-Bud.

In an embodiment, a method includes: (i) determining that a first audio output device is not wirelessly communicatively coupled to a second audio output device; (ii) detecting a request to wirelessly communicatively couple the first audio output device and the second audio output device together and to allow the first audio output device to be discoverable by a companion communication device; (iii) causing one or more wireless link keys stored on the first audio output device and the second audio output device to be erased; and (iv) wirelessly communicatively coupling the first audio output device with the second audio output device.

In some embodiments, determining that the first audio output device is not wirelessly communicatively coupled to the second audio output device includes determining that a MAC address of the first audio output device is not stored as a paired partner MAC address on the second audio output device. In some embodiments, wirelessly communicatively coupling the first audio device with the second audio output device includes causing a MAC address on the first audio output device to be shared with the second audio output device as a paired partner MAC address. In some embodiments, the method further includes (v) determining that the first audio output device wirelessly connects with the companion communication device; and (vi) storing, in the first audio output device, a wireless link key for the companion communication device used to automatically connect the first audio output device with the companion communication device. In some embodiments, detecting the request to wirelessly communicatively couple the first audio output device and the second audio output device includes detecting that the first audio output device and the second audio output device are placed in a housing, and detecting a button being pushed on the housing. In some embodiments, detecting the request to wirelessly communicatively couple the first audio output device and the second audio output device includes detecting that the first audio output device and the second audio output device are placed in a housing, and detecting the housing being opened in a first instance. In some embodiments, detecting the request to wirelessly communicatively couple the first audio output device and the second audio output device includes: detecting that the first audio output device and the second audio output device are placed in a housing; detecting the first audio output device and the second audio output device being removed from the housing; and detecting a wireless discovery polling request from the companion communication device.

In an embodiment, a wireless ear bud case includes: (i) a housing for storing a first wireless ear bud and a second wireless ear bud; (ii) a processor; (iii) a network interface configured to allow the processor to inspect a first memory location on the first wireless ear bud and a second memory location on the second wireless ear bud and to determine that the first wireless ear bud is not communicatively coupled to the second wireless ear bud; and (iv) an input configured for receiving a request to communicatively couple the first wireless ear bud with the second wireless ear bud and to allow the first wireless ear bud to be discoverable by a companion communication device.

In some embodiments, the processor of the wireless ear bud case is further configured to erase one or more wireless link keys stored on the first wireless ear bud and the second wireless ear bud and to cause, via the network interface, the first wireless ear bud to communicatively couple with the second wireless ear bud. In some embodiments, the processor of the wireless ear bud case is further configured to determine that the first wireless ear bud is not coupled to the second wireless ear bud by at least determining that a MAC address stored in the first memory location on the first wireless ear bud is not stored as a paired partner MAC address in the second memory location on the second wireless ear bud. In some embodiments, the processor of the wireless ear bud case is further configured to cause a MAC address on the first wireless ear bud to be shared with the second wireless ear bud as a paired partner MAC address when the first wireless ear bud is communicatively coupled to the second wireless ear bud. In some embodiments, the input of the wireless ear bud case includes a button on the housing of the wireless ear bud case. In some embodiments, the input of the wireless ear bud case includes a sensor on the housing that is configured to detect the housing being opened.

In an embodiment, a method includes: detecting a predetermined event; and in response to detecting the predetermined event, pairing a primary wireless ear bud with a secondary wireless ear bud, the pairing further including: disconnecting the primary wireless ear bud from any existing wireless connections; and wirelessly connecting the primary wireless ear bud to the secondary wireless ear bud.

In some embodiments, the method further includes: detecting that a firmware of the primary wireless ear bud is newer than a firmware of the secondary wireless ear bud; sending the firmware of the primary wireless ear bud from the primary wireless ear bud to the secondary wireless ear bud; and installing the new firmware at the secondary wireless ear bud. In some embodiments, the method further includes disconnecting the secondary wireless ear bud from any existing wireless connections; and wirelessly connecting the secondary wireless ear bud to the primary wireless ear bud. In some embodiments, the method further includes erasing from the primary wireless ear bud and from the secondary wireless ear bud any user history data, including previously paired wireless ear bud data. In some embodiments, detecting the predetermined event includes one or both of: receiving a user input from a wireless ear bud housing; or detecting that two unpaired wireless ear buds are within a predetermined proximity threshold of each other. In some embodiments, wirelessly connecting the primary wireless ear bud to the secondary wireless ear bud includes: storing a first address for the primary wireless ear bud on the secondary wireless ear bud; and storing a second address for the secondary wireless ear bud on the primary wireless ear bud. In some embodiments, detecting the predetermined event includes: detecting that the primary wireless ear bud and the secondary wireless ear bud are placed in a wireless ear bud housing; determining that the primary wireless ear bud and the secondary wireless ear bud are not paired to each other; and receiving a user input to pair the primary wireless ear bud with the secondary wireless ear bud.

In an embodiment, a non-transitory computer-readable storage medium stores instructions that, when executed by a computing device, cause the computing device to perform a method including: determining that a first audio output device is not communicatively coupled to a second audio output device by at least determining that a MAC address of the first audio output device is not stored as a paired partner MAC address on the second audio output device; detecting a request to communicatively couple the first audio output device with the second audio output device and to allow the communicatively coupled first audio output device to be discoverable by a companion communication device by at least detecting that the first audio output device and the second audio output device are placed in a housing and detecting a button being pushed on the housing; pairing the first audio output device with the companion communication device; causing one or more wireless connection keys stored on the first audio output device and on the second audio output device to be erased; communicatively coupling the first audio output device with the second audio output device; causing the MAC address of the first audio output device to be shared with the second audio output device as the paired partner MAC address on the second audio output device; and storing, in the first audio output device, a wireless connection key for the companion communication device used to automatically connect the first audio output device with the third audio output device In an embodiment, an apparatus includes: means for determining that a first audio output device is not communicatively coupled to a second audio output device by at least determining that a MAC address of the first audio output device is not stored as a paired partner MAC address on the second audio output device; means for detecting a request to communicatively couple the first audio output device with the second audio output device and to allow the communicatively coupled first audio output device to be discoverable by a companion communication device by at least detecting that the first audio output device and the second audio output device are placed in a housing and detecting a button being pushed on the housing; means for pairing the first audio output device with the companion communication device; means for causing one or more wireless connection keys stored on the first audio output device and on the second audio output device to be erased; means for communicatively coupling the first audio output device with the second audio output device; means for causing the MAC address of the first audio output device to be shared with the second audio output device as the paired partner MAC address on the second audio output device; and means for storing, in the first audio output device, a wireless connection key for the companion communication device used to automatically connect the first audio output device with the third audio output device.

Figure 5A:
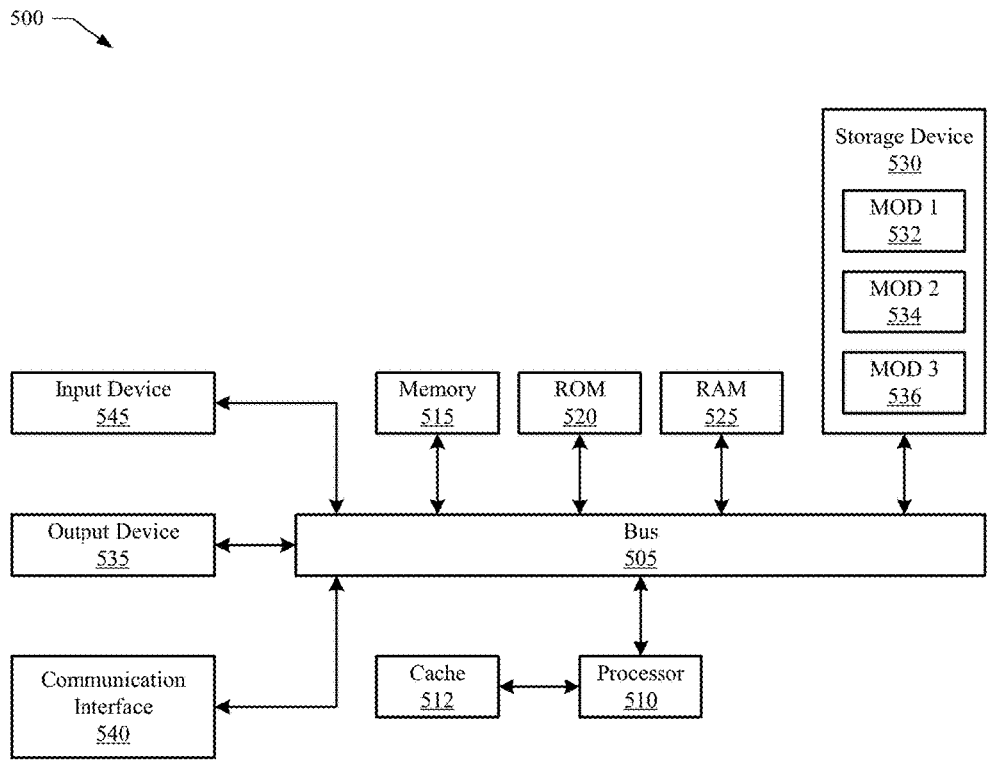
FIG. 5A and FIG. 5B illustrate exemplary possible system embodiments.
Figure 5B:
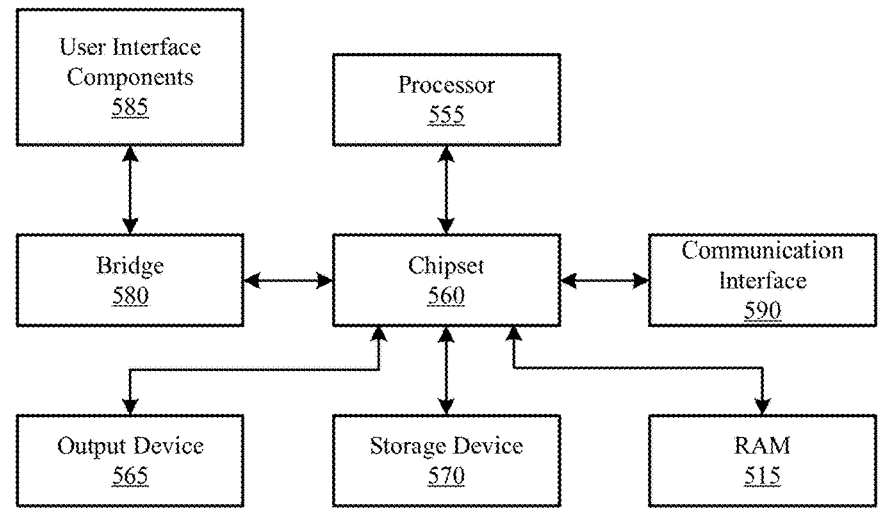

FIG. 5A and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 in which the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for wirelessly pairing an audio output device with a companion communication device, the method comprising:
    detecting opening of a cover of a case that houses the audio output device;
    determining, responsive to detecting the opening of the cover of the case, whether the audio output device is wirelessly paired with the companion communication device;
    causing the audio output device to be discoverable by the companion communication device, when:
        the audio output device is not paired with the companion communication device; and
        the companion communication device is within a wireless personal area network pairing range of the audio output device; and
    pairing the audio output device with the companion communication device.

2. The method of claim 1, wherein pairing the audio output device with the companion communication device comprises:
    causing one or more wireless link keys stored on the audio output device to be erased; and
    storing in the audio output device a wireless link key associated with the companion communication device.

3. The method of claim 2, wherein the wireless link key associated with the companion communication device is used to connect the audio output device with the companion communication device automatically when previously wirelessly paired.

4. The method of claim 1, further comprising:
    causing the companion communication device to present on a display an indication of wireless pairing with the audio output device.

5. The method of claim 1, wherein the pairing the audio output device with the companion communication device is performed responsive to receipt of an input via a display of the companion communication device.

6. The method of claim 5, wherein the input comprises credentials for pairing the companion communication device.

7. The method of claim 1, further comprising:
    communicatively coupling the audio output device with a second audio output device housed in the case.

8. The method of claim 7, wherein communicatively coupling the audio output device with the second audio output device comprises:
    causing a media access control (MAC) address on the audio output device to be shared with the second audio output device as a paired partner MAC address.

9. The method of claim 7, wherein the audio output device and the second audio output device comprise a pair of wireless ear buds.

10. A case for storing audio output devices, the case comprising:
    a housing for storing one or more audio output devices, the housing including a cover;
    a sensor communicatively coupled to the cover, the sensor indicating opening of the cover;
    a network interface configurable for wireless communication with a companion communication device; and
    a processor communicatively coupled to a memory storing instructions that, when executed by the processor cause a method to be performed, the method comprising:
        detecting opening of the cover;
        determining, responsive to detecting the opening of the cover, whether an audio output device stored in the housing is wirelessly paired with the companion communication device;
        causing the audio output device to be discoverable by the companion communication device, when:
            the audio output device is not paired with the companion communication device; and
            the companion communication device is within a wireless personal area network pairing range of the case that houses the audio output device; and
        pairing the audio output device with the companion communication device.

11. The case of claim 10, wherein pairing the audio output device with the companion communication device comprises:
    causing one or more wireless link keys stored on the audio output device to be erased; and
    storing in the audio output device a wireless link key associated with the companion communication device.

12. The case of claim 11, wherein the wireless link key associated with the companion communication device is used to connect the audio output device with the companion communication device automatically when previously wirelessly paired.

13. The case of claim 10, wherein execution of the instructions further causes the companion communication device to present on a display an indication of wireless pairing with the audio output device.

14. The case of claim 10, wherein the pairing the audio output device with the companion communication device is performed responsive to receipt of an input via a display of the companion communication device.

15. The case of claim 14, wherein the input comprises credentials for pairing the companion communication device.

16. The case of claim 10, wherein execution of the instructions further causes communicatively coupling the audio output device with a second audio output device housed in the case.

17. The case of claim 16, wherein communicatively coupling the audio output device with the second audio output device comprises:
    causing a media access control (MAC) address on the audio output device to be shared with the second audio output device as a paired partner MAC address.

18. The case of claim 10, wherein the audio output devices comprise a pair of wireless ear buds.

19. A wireless ear bud comprising:
a communication interface configurable for wireless communication with a companion communication device; and
a processor communicatively coupled with a memory storing instructions that, when executed by the processor cause operations to be performed, the operations comprising:
receiving a signal from a case housing the wireless ear bud, the signal indicating that a cover of the case has been opened;
in response to receiving the signal, entering a pairing mode in which the wireless ear bud can be paired with the companion communication device; and
pairing with the companion communication device.

20. The wireless ear bud of claim 19, wherein the operations further comprise:
establishing, but the wireless ear bud, a connection with a second wireless ear bud housed in the case, including storing, in the memory, address information corresponding to the second wireless ear bud.

* * * * *